United States Patent
Koide

(10) Patent No.: US 7,240,622 B2
(45) Date of Patent: Jul. 10, 2007

(54) TRAVEL CONTROL METHOD FOR TRAVEL VEHICLE

(75) Inventor: Hiroyuki Koide, Komaki (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 10/936,383

(22) Filed: Sep. 8, 2004

(65) Prior Publication Data

US 2005/0081736 A1  Apr. 21, 2005

(51) Int. Cl.
*B60L 11/00* (2006.01)
*B61C 9/00* (2006.01)

(52) U.S. Cl. .......................... 104/287; 105/96
(58) Field of Classification Search ............. 104/88.01, 104/88.02, 88.04, 287, 288; 105/96, 96.1, 105/98
See application file for complete search history.

(56) References Cited

U.S. PATENT DOCUMENTS

| | | | | |
|---|---|---|---|---|
| 4,374,353 A | * | 2/1983 | Habisohn | .................... 318/799 |
| 4,483,148 A | * | 11/1984 | Minami | ........................ 60/698 |
| 5,901,805 A | * | 5/1999 | Murakami et al. | .......... 180/168 |
| 6,871,715 B1 | * | 3/2005 | Diaz et al. | .................. 180/65.5 |

FOREIGN PATENT DOCUMENTS

JP  2001-240213  4/2001

* cited by examiner

*Primary Examiner*—S. Joseph Morano
*Assistant Examiner*—Robert J. McCarry, Jr.
(74) *Attorney, Agent, or Firm*—D. Peter Hochberg; Sean Mellino

(57) ABSTRACT

In a conveying cart, a front side wheel (a front wheel) for supporting the conveying cart is provided with a travel driving unit (a front wheel inverter and a travel motor), and a rear side wheel (a rear wheel) for supporting the conveying cart is provided with a travel driving unit (a rear wheel inverter and a travel motor). When the conveying cart travels in a curve portion of a travel path, the travel driving unit for the front wheel of the conveying cart on which the center of gravity is located is subjected to speed control, and the travel driving unit for the rear wheel of the conveying cart that tends to float up is subjected to torque control.

3 Claims, 14 Drawing Sheets

FIG. 7

CONVEYANCE MANAGEMENT LIST

| CART No | DURING EXECUTION OF CONVEYANCE CYCLE | DURING TRAVEL | CURRENT POSITION ADDRESS | CONVEYANCE DATA ||||| TOTAL CONVEYANCE CYCLE EXECUTION TIME | TRAVEL DATA ||||
|---|---|---|---|---|---|---|---|---|---|---|---|---|
| | | | | CONVEYANCE SOURCE ADDRESS | CONVEYANCE START TIME | CONVEYANCE DESTINATION ADDRESS | CONVEYANCE END TIME | | | TRAVEL DESTINATION ADDRESS | TRAVEL START TIME | TRAVEL END TIME | TOTAL TRAVEL TIME |
| 1 | | | | | | | | | | | | | |
| 2 | | | | | | | | | | | | | |
| 3 | | | | | | | | | | | | | |
| 4 | | | | | | | | | | | | | |
| 5 | | | | | | | | | | | | | |

FIG. 11

| MODE | TRAVEL STATE | TRAVEL PATH | FRONT WHEEL | REAR WHEEL |
|---|---|---|---|---|
| 0 | STATIONARY | LINEAR | TORQUE CONTROLL | SPEED CONTROLL |
| 1 | STATIONARY | CURVE | SPEED CONTROLL | TORQUE CONTROLL |
| 2 | STATIONARY | CURVE | SPEED CONTROLL | FREE - RUN/ TORQUE CONTROLL |
| 3 | STATIONARY | CURVE | POSITIONAL SPEED CONTROLL | POSITIONAL SPEED CONTROLL |
| 4 | ACCELERATION | | TORQUE CONTROLL | SPEED CONTROLL |
| 5 | DECELERATION | | SPEED CONTROLL | TORQUE CONTROLL |

TRAVEL CONTROL METHOD FOR TRAVEL VEHICLE

BACKGROUND OF THE INVENTION

1. Field of the Invention

The present invention relates to a travel control method for a travel vehicle which is supported by wheels provided at the front and rear thereof and which travels while being guided by a travel path.

2. Description of the Related Art

As a conventional travel control method for a travel vehicle of this kind, a travel control method for a travel vehicle as described below has been disclosed.

The travel vehicle is a conveying cart which travels while being guided by guide rails in a loop, for example, and conveys an article between stations disposed along the guide rails. Wheels mounted at the front and rear of the conveying cart are provided with travel driving units, respectively. A conveying cart travels to a target station by driving the travel driving units according to an article conveyance command, thereby to convey the article.

In such a conventional travel control method for a travel vehicle as described above, the conveying cart with travel driving units attached to the respective wheels at the front and rear has posed a problem that when a cart speed is attempted to be maintained at a prescribed value, the wheels are caused to differ from one another in the number or rotations, therefore if the wheels are driven to rotate at a same speed, the rails and the wheels are caused to wear by the spinning of the wheels. Further, if the travel cart passes through a curve at a high speed, the wear of the rails and wheels becomes more conspicuous.

SUMMARY OF THE INVENTION

It is an object of the present invention to provide a travel control method for a travel vehicle, by which the travel vehicle can pass through a curve portion of a travel path at a high speed.

The present invention is directed to a travel control method for a travel vehicle which includes travel driving units attached to the front and rear wheels in order for driving the respective wheels which support the travel vehicle, and which travels while being guided by a travel path having a linear portion and a curve portion, wherein the travel driving unit for the front wheel in the travel direction of the travel vehicle is subjected to speed control when the travel vehicle travels in the curve portion. Thus, the travel speed in the curve portion is maintained at a prescribed value.

BRIEF DESCRIPTION OF THE DRAWINGS

FIG. 7 is a conveyance management list table of a body controller of the article conveying system;

FIG. 11 is a descriptive table for travel control modes of the article conveying system;

DESCRIPTION OF THE PREFERRED EMBODIMENTS

Description will be given of embodiments of the present invention below, based on the accompanying drawings.

Figure 1:
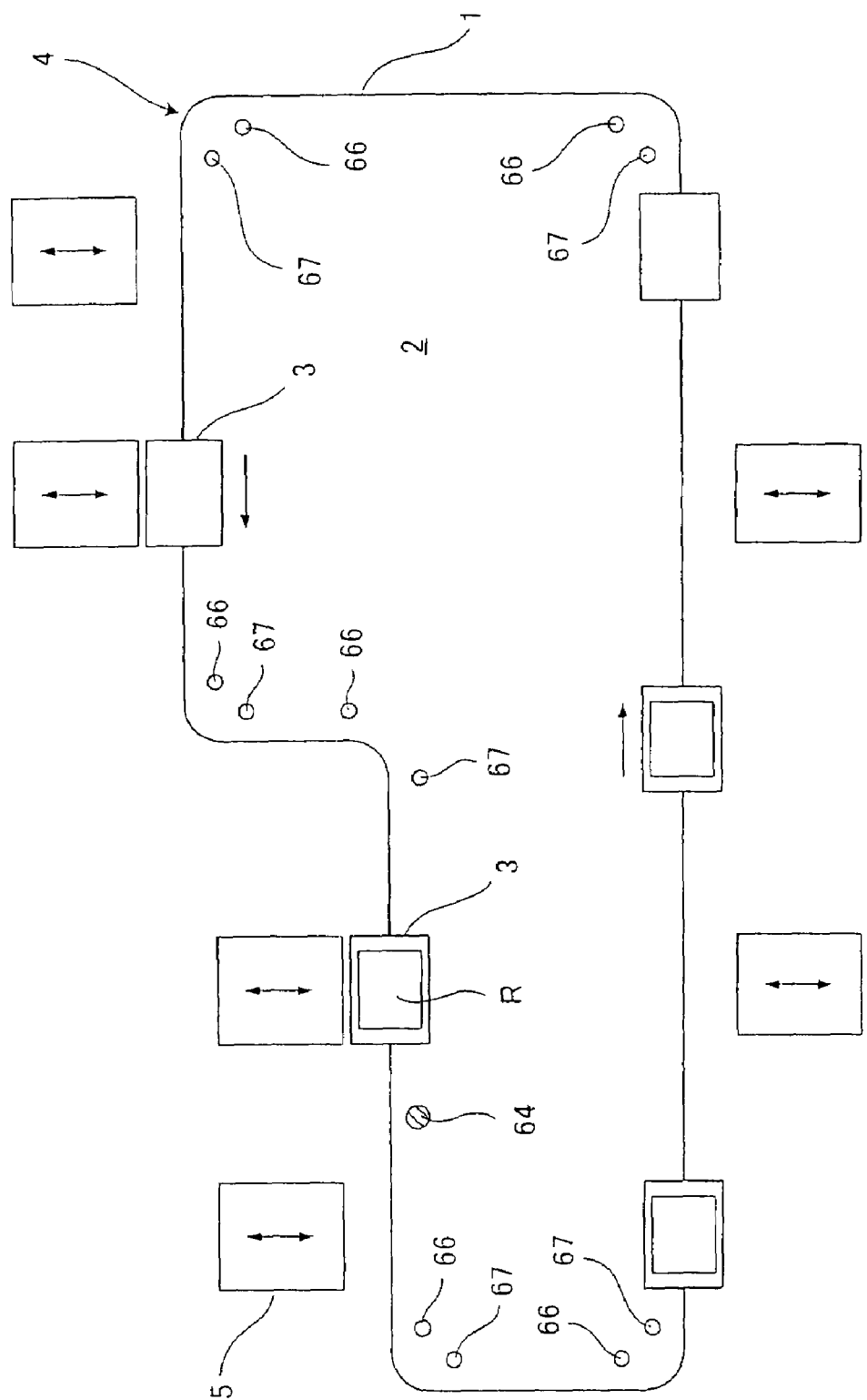
FIG. 1 is a travel path diagram of an article conveying system in an embodiment of the present invention.

Description will be given of a travel control method for a travel vehicle of the present invention, taking up a case where the method is applied to a conveying cart included in an article conveying system. FIG. 1 is a travel path diagram of an article conveying system in an embodiment of the present invention and FIG. 2 is a diagram of a structure of a main part of the article conveying system.

Figure 2:
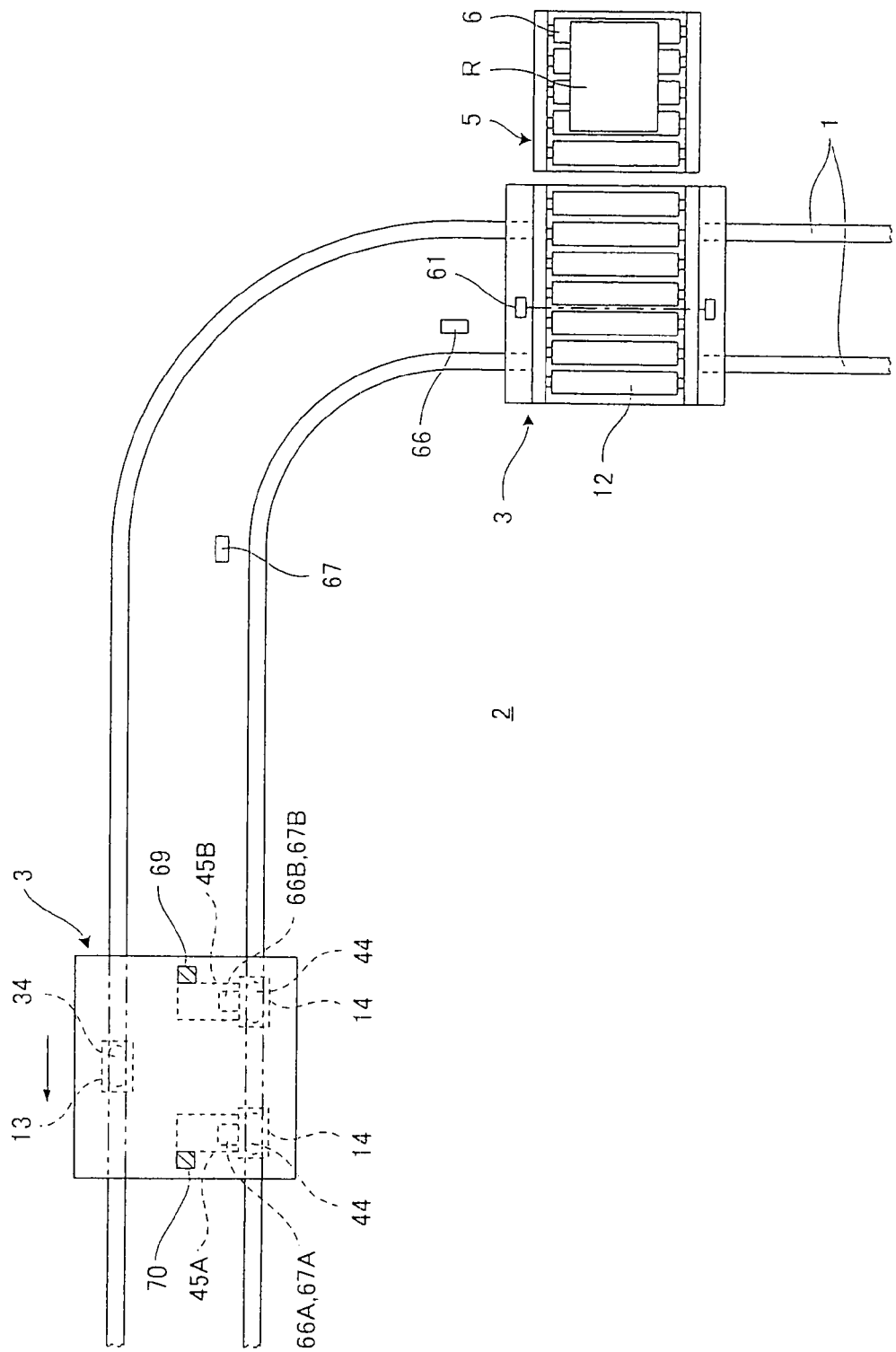
FIG. 2 is a diagram of a structure of a main part of the article conveying system.
Figure 3:
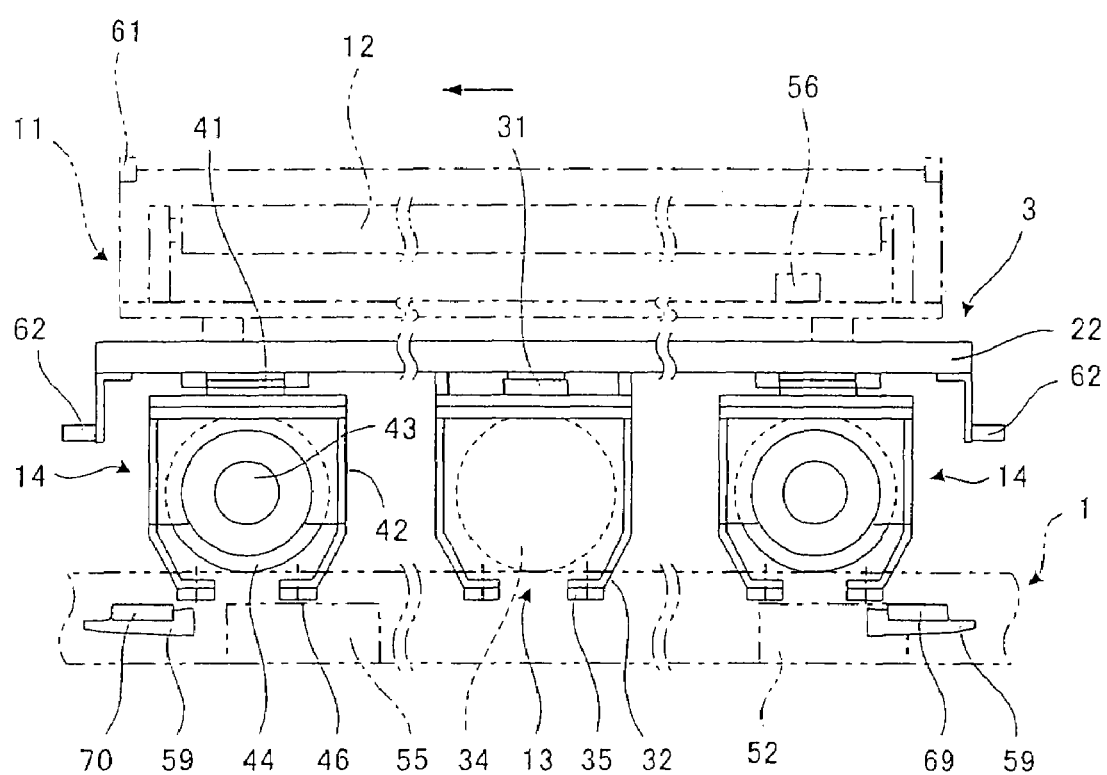
FIG. 3 is a side view of travel rails and a conveying cart of the article conveying system.
Figure 4:
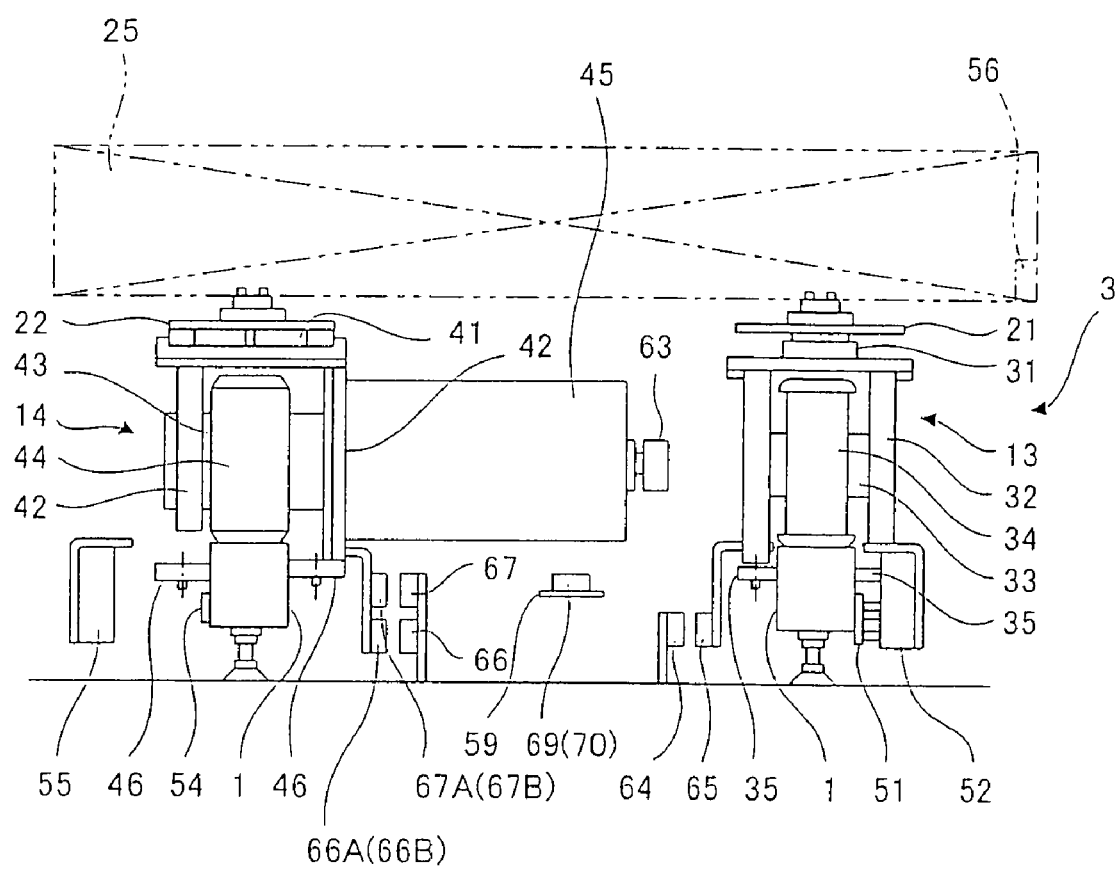
FIG. 4 is a sectional view of the travel rails of the article conveying system and a front view of a main part of the conveying cart.

In FIGS. 1 and 2, a numerical symbol 1 indicates a pair of rails laid out on a floor 2, and 3 three-wheel conveying carts (an example of the travel vehicle) traveling while being guided by the travel rails 1 to convey an article R. Note that the total number of three-wheel conveying carts is five.

A travel path 4, which is a loop having linear portions, clockwise curve portions and a counterclockwise curve portion, is constituted of the travel rails 1 and plural stations (a conveyance source or destination for an article) 5 are disposed along the travel path 4. At each station 5, there is provided a transfer conveyor unit 6 carrying in or carrying out the article R between the station and each conveying cart 3.

A conveying cart 3 is, as shown in FIGS. 2 to 5, provided with a vehicle body 11, transfer placement conveyor unit 12, one rotatable driven wheel unit 13, two rotatable slidable driving wheel units 14 and the like.

Figure 5:
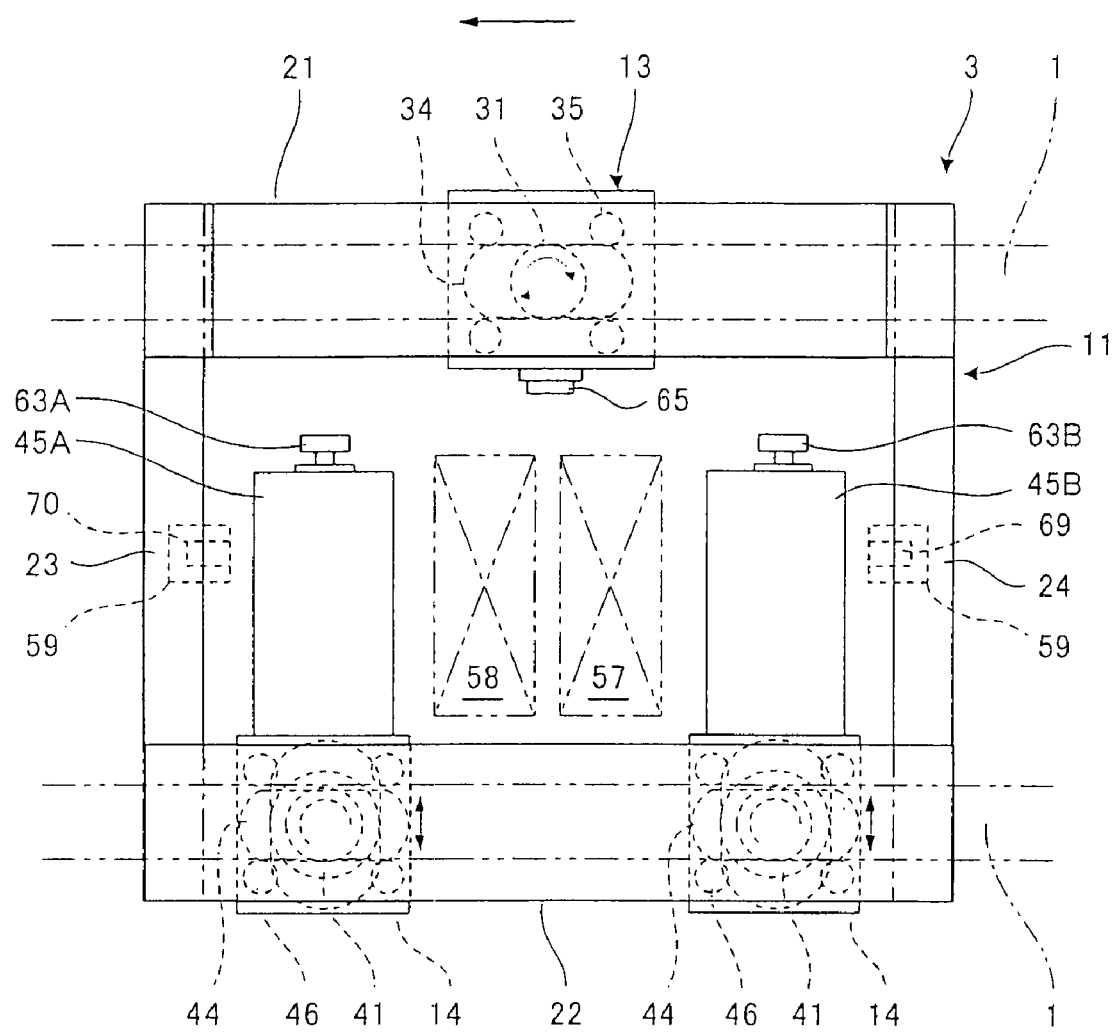
FIG. 5 is a plan view of part of the conveying cart of the article conveying system.

The vehicle body 11 is, as shown in FIG. 5, constituted of a right long narrow piece 21, a left long narrow piece 22, front and rear long narrow pieces 23 and 24, a box 25. The right long narrow piece 21 supports the one rotatable driven wheel unit 13 at the center thereof in a freely rotatable manner around a vertical axis thereof. The left long narrow piece 22 supports the two rotatable slidable driving wheel units 14 so as to be freely rotatable about a vertical axis and freely travelable in a left to right or vice versa direction (in a direction, farther from to closer to or vice versa the rotatable driven wheel unit 13). Each of the front and rear long narrow pieces 23 and 24 and the right long narrow piece 21 and the left long narrow piece 22 is fixed at both ends. The box 25 is fixed on a frame formed with the right long narrow piece 21 and the left long narrow piece 22 and the front and rear long narrow pieces 23 and 24.

The transfer placement conveyor unit 12 is installed in the box 25 and performs transfer and placement of the article R carried on the vehicle body 11.

The rotatable driven wheel unit 13 is attached in the lower portion of the vehicle body 11 and support the vehicle body 11 on one of the travel rails 1. The rotatable driven wheel unit 13 is constructed from a rotatable member 31, a bracket 32, an axle 33, freely rotatable wheel 34 and four guide rollers 35. The rotatable member 31 is formed so as to be freely rotatable about the vertical axis relative to the right long narrow piece 21. The bracket 32 is connected to the lower surface side of the rotatable member 31 and has a pair of legs corresponding to both sides of the one travel rail 1. The axle 33 is provided at the central portions of both legs of the bracket 32. The freely rotatable wheel 34 is supported by the axle 33 in a freely rotatable manner. The four guide rollers 35 are provided on the lower end portions of both legs of the bracket 32 at ends forward and rearward, and left and right thereof and contact both sides of the one travel rail 1 in a freely rotatable manner. The rotatable member 31 rotates about the vertical axis in a manner adapted for a curve of the one travel rail 1 with the actions of the four guide rollers 35 and through the bracket 32, and thereby the freely rotatable wheel 34 is positioned relative to the travel rail 1 and can travel on the one travel rail 1 without being disengaged.

Each rotatable slidable driving wheel unit 14 not only supports the vehicle body 11 on the other travel rail 1, but also is followable to a curve of the other rail 1 and formed so as to be able to move freely farther from or closer to (so as to be freely slidable relative to) the rotatable driven wheel unit 13. Each rotatable slidable driving wheel unit 14 is constructed from a rotatable member 41, a bracket 42, an axle 43, a driving wheel 44, a travel motor 45 and four guide rollers 46.

The rotatable member 41 is formed so as to be freely rotatable about the vertical axis relative to the left long narrow piece 22. The bracket 42 is connected to the lower surface side of the rotatable member 41 and has a pair of legs corresponding to both sides of the other travel rail 1. The axle 43 is provided at the central portions of both legs of the bracket 42. The driving wheel 44 is supported by the axle 43 The driving shaft of the travel motor 45 is connected to a rotary shaft of the driving wheel 44. The four guide rollers 46 are provided on the lower end portions of both legs of the bracket 42 at ends forward and rearward, and left and right thereof and contact both sides of the other travel rail 1 in a freely rotatable manner. The rotatable member 41 rotates about the vertical axis in a manner adapted for a curve of the other travel rail 1 with the actions of the four guide rollers 46 and through the bracket 42, and moves leftward or rightward so as to be adapted for a width of the pair of travel rails 1 through the bracket 42, and thereby the driving wheel 44 can travel on the other travel rail 1 without being disengaged. The driving wheel 44 rotates by driving with the travel motor 45, thereby enabling the conveying cart 3 to travel on the other rail 1 while being guided thereby.

In such a way, the two driving wheels 44 are provided with the construction that is freely rotatable and slidable (is able to move freely farther from or closer to the freely rotatable wheel 34) and thereby positioned by the one freely rotatable wheel 34, and perform smooth travel of the conveying cart 3 in a curve portion without causing any trouble, thereby preventing the body 11 from swaying in a left to right or vice versa direction. Moreover, since a load on the travel motor 45 of each driving wheel 44 is alleviated, the freely rotatable wheel 34 and the driving wheels 44 can adopt a simple and easy construction as compared with a case where positioning is performed by the driving wheels 44.

A collector rail 51 is laid on over the total length along a travel direction of the one travel rail 1 on the outer side surface thereof and a collector 52 is provided on the outer leg of the bracket 32 of the one rotatable driven wheel unit 13.

A feeder line 54 is laid on over the total length along the travel direction of the other rail 1 on the outer side thereof and a wireless modem 55 is provided on the outer legs of the brackets 42 of the two rotatable slidable driving wheel units 14 facing adjacent to the feeder line 54.

A control box 57 and a power box 58 are fixed in an empty space between the two motors 45 (45A and 45B) in the frame constructed from the right long narrow piece 21, the left long narrow piece 22, and the front and rear long narrow pieces 23 and 24 in a portion below the box 25 of the vehicle body 11.

A transfer section detector 61 constituted of a photoelectric switch is provided in the box 25 as a sensor detecting the presence or absence of the article R on the article transfer placement conveyor unit 12 and a prescribed position of the article R (deviation). A bumper switch 62 is provided to the vehicle body 11 in order to detect a rear end collision. Encoders 63A and 63B to detect the number of rotations of the respective travel motors are provided to the driving shafts of the travel motors 45A and 45B.

An origin indicator 64 having a reflector (such as a mirror) indicating the start point of a travel position is provided at a site along the travel rails 1 on the travel path 4 and an origin detector 65 constituted of a reflection photoelectric switch to detect the origin indicator 64 is provided on the bracket 32 of the rotatable driven wheel unit 13. The start point 66 and the end point 67 having reflectors (such as mirrors) indicating the entrance position and exit position of a curve are installed at the entrance position and exit position of the curve of the travel rails 1 on the travel path 4. Start point detectors 66A and 66B, and end point detectors 67A and 67B each constituted of a reflection photoelectric switch to detect the start point 66 or the end point 67 are provided to the brackets 42 of the rotatable slidable driving wheel units 14 so as to match the center positions of the driving wheels 44.

An optical sensor transmitter 69 and an optical sensor receiver 70 are provided as a data transmitter-receiver for performing transmission or reception of data between conveying carts 3, one preceding to the other.

A flat plate 59 serving as an interception member for the optical sensor transmitter 69 and the optical receiver 70 intercepting a downward leakage of light as a second role is provided below the box 25 of the vehicle body 11 at the central position thereof in a forward to backward direction, and the optical sensor transmitter 69 and the optical receiver 70 are mounted on the flat plate 59 facing backward and forward, respectively. The optical sensor transmitter 69 and the optical receiver 70 are further mounted between the upper surface level and lower surface level of the travel rails 1.

Figure 6:
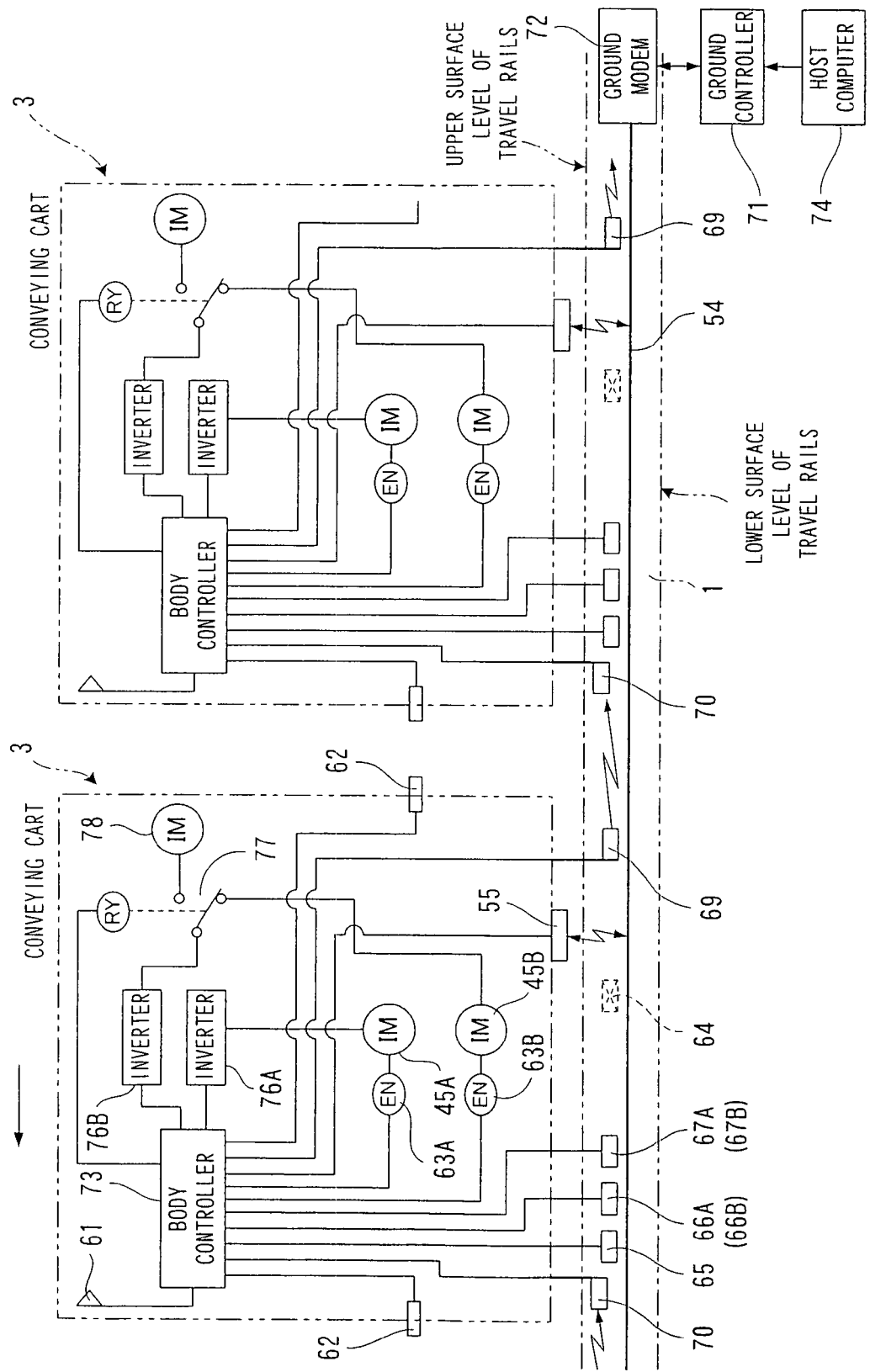
FIG. 6 is a control block diagram of the conveying cart of the article conveying system.

FIG. 6 shows a control block diagram of the facility and a conveying cart 3.

In FIG. 6, a numerical symbol 71 is constituted of a microcomputer, and a ground controller totally controlling plural conveying carts 3 and provided at a site along the travel rails 1 on which a convey cart 3 travels. The ground controller 71 is inputted with transfer information on the article R (the number of a station 5 as a conveyance source from which a conveyance request for the article R is issued and the number of a station 5 as a conveyance destination to which the article R is conveyed) from a station 5 at which transfer of the article R is performed and a host computer 74, and feed back signals of each transfer cart 3 from the ground modem 72 described later (for example, conveyance reception data of conveyance data (described later) and the address data of a current position) and judges the situation to perform control on travel destinations or whether or not transfer is performed for each conveying cart 3.

The ground controller 71 controls each conveying cart 3 based on a conveyance management list (memory) L shown in FIG. 7. The conveyance management list L, for each conveying cart 3, is constituted of data of whether or not it is (during execution of a conveyance cycle), data of whether or not it is (during travel) for changing a position without carrying an article R, a current position address, a conveyance data (formed with the number of a station 5 as a conveyance source, a start time of conveyance, the number of a station 5 as a conveyance destination, and an end time of conveyance), a total conveyance cycle execution time, travel data (formed with the address of a travel destination, a travel start time and a travel end time), and a total travel time. The current position address is sequentially updated by an address A of a travel section of the current position data transmitted from the body controller 73 of each conveying cart 3.

The ground controller 71 performs transmission of a signal with a conveyance cart 3 through a ground modem 72 corresponding to a transmitter-receiver and the feeder line 54 functioning as an antenna. The body controller 73 of each conveying cart 3 performs transmission of a signal with the ground controller 71 through the wireless modem 55 installed facing adjacent to the feeder line 54.

The control box 57 is housed in the body controller 73. A power supply unit (not shown) connected to a front wheel inverter 76A, a rear wheel inverter 76B, a change-over switch 77 and the collector 52, and supplying electricity to units in a conveying cart 3 is housed in the power box 58.

Figure 8:
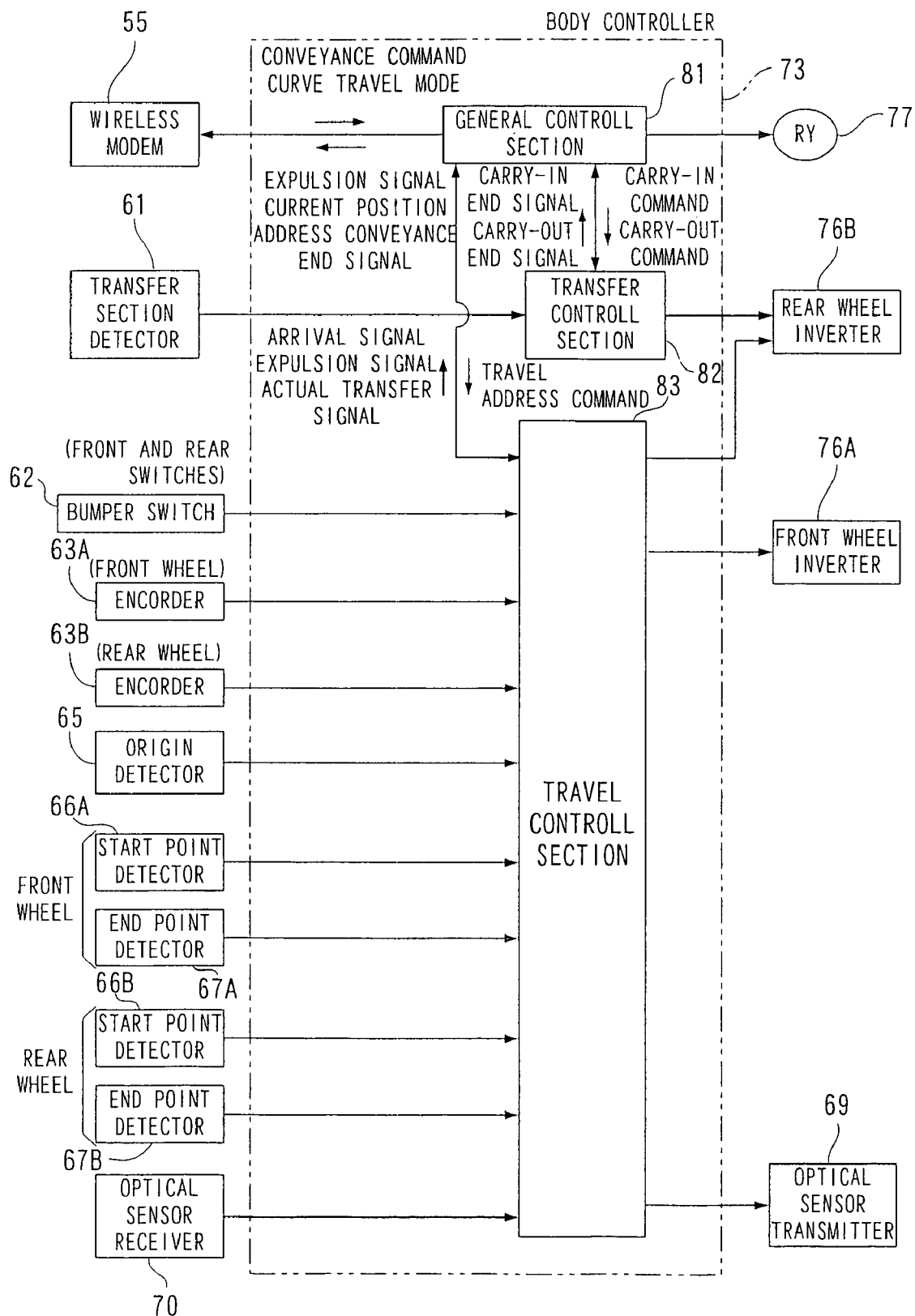
FIG. 8 is a control block diagram of the body controller of the article conveying system.

The body controller 73 of the conveying cart 3 is a controller controlling travel of the conveying cart 3 and transfer of an article R between a station 5 and the conveying cart 3. The body controller 73 is, as shown in FIG. 8, constituted of a general control section 81, a transfer control section 82 controlling transfer of the article R between the conveying cart 3 and a station 5, and a transfer control section 83 controlling the conveying cart 3. As shown in FIGS. 6 and 8, the ground controller 71 is not only connected to the general control section 81 through the wireless modem 55, the feeder line 54 and the ground modem 72, but an exciting coil of the change-over switch 77 is also connected to the general control section 81. Not only is the transfer section detector 61 connected to the transfer control section 82, but the transfer motor 78 of the article transfer placement conveyor unit 12 is also connected to the transfer control section 82 through the rear wheel inverter 76B and the change-over switch 77. Connected to the transfer control section 83 are the bumper switches 62 of two conveying carts, one preceding to the other, the encoder 63A of the driving wheel 44 in the front side in the transfer direction of the conveying cart 3 (hereinafter, referred to as a front wheel for short), the encoder 63B of the driving wheel 44 in the rear side in the transfer direction of the conveying cart 3 (hereinafter, referred to as a rear wheel for short), the origin detector 65, the start point detector 66A and end point detector 67A of the front wheel 44, the start point detector 66B and end point detectors 67B of the rear wheel 44, the optical sensor transmitter 69 and the optical sensor receiver 70. Connected to the travel control section 83 are the travel motor 45A for the front wheel 44 through the front wheel inverter 76A and, furthermore, the travel motor 45B for the rear wheel 44 through the rear wheel inverter 76B and the change-over switch 77. A travel driving unit for the front wheel 44 is constituted of the front wheel inverter 76A and the travel motor 45A and a travel driving unit for the rear wheel 44 is constituted of the rear wheel inverter 76B and the travel motor 45B.

The general control section 81 in which the specific numbers of conveying carts (cart numbers) are set is inputted with conveyance data from the ground controller 71 inputted from the wireless modem 55 (constituted of the address of a station 5 as a conveyance source for an article attached with the specific number of a conveying cart and the address of a station 5 as a conveyance destination) or a curve travel mode (described later) and confirms that the data is one of its own from the specific number of the conveying cart attached to the data. When data inputted to the general control section 81 is the curve travel mode, the general control section 81 transfers the data to the travel control section 83.

The following control is executed in a case where the data inputted to the general control section 81 is conveyance data:

1. The general control section 81 outputs the address of a station 5 as a conveyance source to the travel control section 83.

2. The general control section 81, when being inputted with an arrival signal to the station 5 as a conveyance source from the travel control section 83, changes over the change-over switch 77 to the transfer motor 78 side of the article transfer placement conveyor unit 12 and outputs a carry-in command for the article R to the transfer control section 82.

3. The general control section 81, when being inputted with a carry-in end signal for the article R from the transfer control section 82, changes over the change-over switch 77 to the travel motor 45B side of the rear wheel 44 and outputs the address of the station 5 as a conveyance destination to the travel control section 83.

4. The general control section 81, when being inputted with an arrival signal to the station 5 as a conveyance destination from the travel control section 83, changes over the change-over switch 77 to the transfer motor 78 side of the article transfer placement conveyor unit 12 and outputs a carry-out command for the article R to the transfer control section 82.

5. The general control section 81, when being inputted with a carry-out end signal for the article R from the transfer control section 82, changes over the change-over switch 77 to the travel motor 45B side for the rear wheel 44, and outputs a carry-out end signal to the ground controller 71.

The general control section 81, when being inputted with an expulsion signal (detailed later) from the travel control section 83, outputs the signal attached with the specific number of a conveying cart to the ground controller 71. The general control section 81 is set therein with respect to the addresses of respective travel sections corresponding to travel distances from the origin 64 of the travel rails 1 in advance and recognizes the address of a travel section corresponding to a current travel distance (detailed later) inputted from the travel control section 83 based on the settings and outputs the address of the recognized travel section at the current position attached with the specific number of a conveying cart to the ground controller 71.

The transfer control section 82, when being inputted with a carry-in command for the article R from the general control section 81, outputs a transfer signal to the rear wheel inverter 76B (the transfer motor 78) so as to transfer the article R to a conveying cart 3 from a station 5 to cause the article R to be carried in by the article transfer placement conveyor unit 12. A stop command is outputted to the article transfer placement conveyor unit 12 by detection of the article R with the transfer section detector 61 not only to stop the article transfer placement conveyor unit 12 but also to output a carry-in end signal to the general control section 81. The transfer control section 82, when being inputted with a carry-in command, outputs a transfer signal to the inverter 76B (transfer motor 78) so as to transfer the article R to station 5 from a conveying cart 3 to cause the article transfer placement conveyor unit 12 to carry out the article R. When a prescribed time elapses after no article R is detected by the transfer section detector 61, a stop command is outputted not only to stop the article transfer placement conveyor unit 12, but also to output a carry-in end signal to the general control section 81. With such operations applied, transfer of an article R between a conveying cart 3 and a station 5 is controlled.

Figure 9:
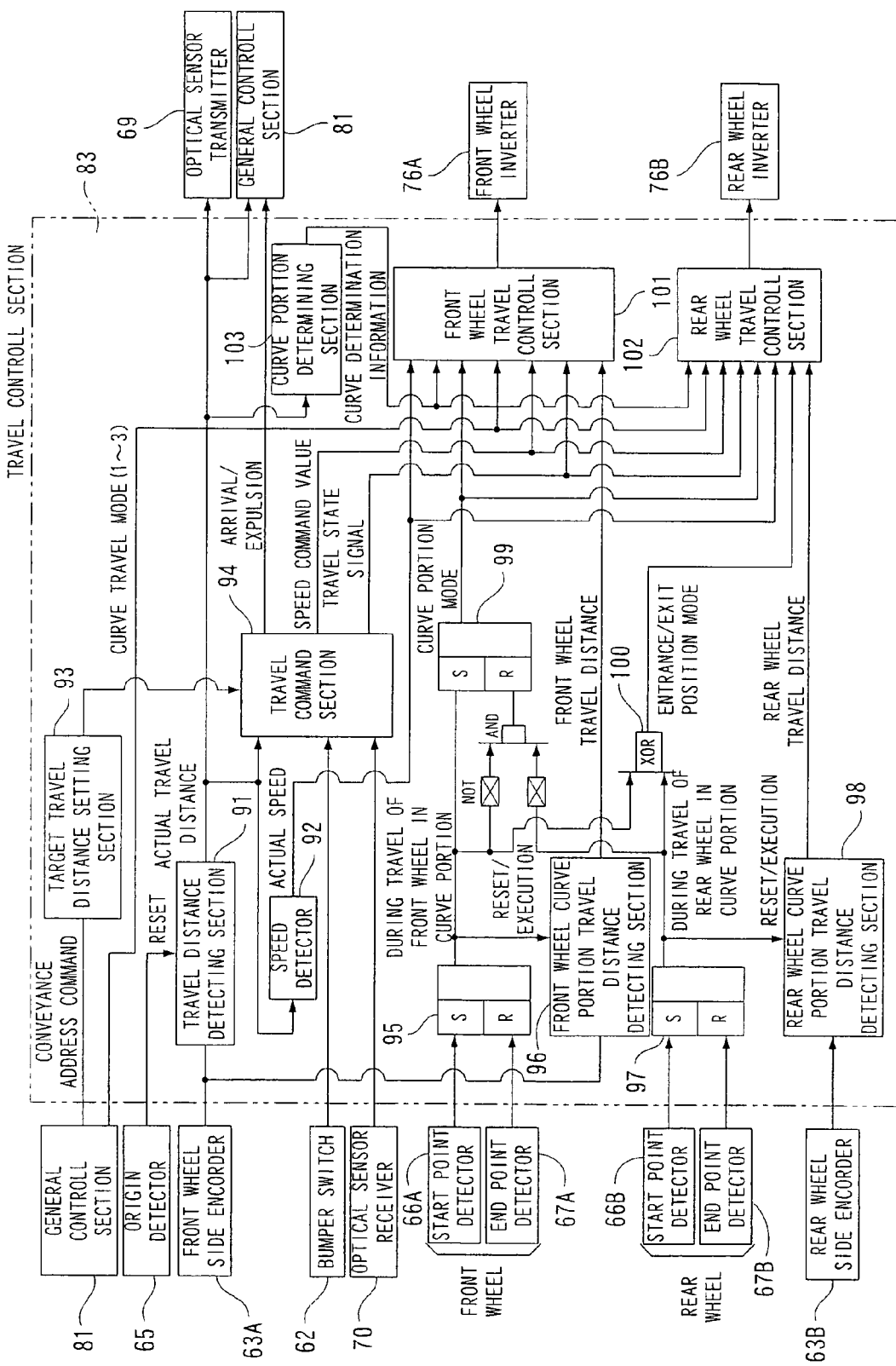
FIG. 9 is a control block diagram of a travel control section of the body controller of the article conveying system.

In FIG. 9, there is shown a control block of the transfer control section 83.

The transfer control section 83 is constituted of a transfer distance detecting section 91, a speed detecting section 92, a target travel distance setting section 93, a travel command section 94, RS flip-flops 95, 97 and 99, a front wheel curve portion travel distance setting section 96, a rear wheel curve portion travel distance setting section 98, XOR 100, a front wheel travel control section 101, a rear wheel travel control section 102, and a curve portion determining section 103.

The travel distance detecting section 91 is reset by inputting a detection signal from the origin detector 65, counts pulse signals inputted from the front wheel side encoder 63A and measures an actual travel distance of a conveying cart 3 from the origin 64 and outputs the actual travel distance to the general control section 81 and the optical sensor transmitter 69.

The speed detecting section 92 differentiates a travel distance measured by the travel distance detecting section 91 and measures an actual speed.

The target travel distance setting section 93, when being inputted with the address of a station 5 as a conveyance source or a conveyance destination from the general control section 81, obtains a transfer distance (a target transfer distance) from the origin 64 of the station 5 as a conveyance source or a conveyance destination using the address. Note that travel distances from the origin 64 are set for the addresses of respective stations 5 in advance.

The travel command section 94 forms a speed command value based on a target travel distance obtained by the target travel distance setting section 93, an actual travel distance measured by the travel distance detecting section 91, a detection signal of the bumper switch 62, and an actual travel distance of a traveling conveying cart 3 preceding an objective conveying cart 3 which is inputted from the optical sensor receiver 70, and outputs the speed command value to the front wheel travel control section 101 (which will be described later) and the rear wheel travel control section 102 (which will be described later). Furthermore a travel state (in an acceleration state or deceleration state) is obtained and outputted and an arrival signal to the target station 5 and an expulsion signal are outputted to the general control section 81.

The RS flip-flop 95 is set by inputting a detection signal from the start point detector 66A for the front wheel 44 and reset by inputting a detection signal from the end point detector 67A. By doing so, it can be detected that the front wheel 44 travels in a curve portion or located there (during travel of the front wheel in a curve portion).

The front wheel curve portion travel distance detecting section 96 is reset/executed by a signal indicating that the front wheel 44 detected by the RS flip-flop 95 is during travel in a curve portion to count pulse signals inputted from the front wheel side encoder 63A and to measure an actual travel distance of the front wheel 44 from the start point 66 of the curve portion.

The RS flip-flop 97 is set by inputting a detection signal from the start point detector 66B for the rear wheel 44 and reset by inputting a detection signal from the end point detector 67B. By doing so, it can be detected that the rear wheel 44 travels in a curve portion or located there (during travel of the rear wheel in a curve portion).

The rear wheel curve portion travel distance detecting section 98 is reset/executed by a signal indicating that the rear wheel 44 detected by the RS flip-flop 97 is during travel in a curve portion to count pulse signals inputted from the rear wheel side encoder 63B and to measure an actual travel distance of the rear wheel 44 from the start point 66 of the curve portion.

The RS flip-flop 99 is set by a signal indicating that the front wheel 44 detected by the RS flip-flop 95 is during travel in a curve portion and reset when a signal indicating that the front wheel 44 is during travel in the curve and a signal indicating that the rear wheel 44 detected by the RS flip-flop 97 is during travel in the curve portion are both tuned off. By doing so, it is detected that a conveying cart 3 travels in the curve portion (curve portion mode).

The XOR 100 operates when one of a signal indicating that the front wheel 44 detected by the RS flip-flop 95 is during travel in a curve portion and a signal indicating that the rear wheel 44 detected by the RS flip-flop 97 is during travel in the curve portion is turned on and detects that one of the front wheel 44 and rear wheel 44 is present in the curve portion, that is one of the front wheel 44 and rear wheel 44 is located at the entrance or exit of the curve portion (a position where a linear portion and a curve portion of the travel rails are connected) (entrance or exit position mode).

The front wheel travel control section 101 outputs a control mode (torque control or speed control) and a speed command value (in speed control) to the front wheel inverter 76A, based on a curve travel mode inputted from the general control section 81, a speed command value and data of a travel state inputted from the travel command section 94, an actual speed measured by the speed detector 92, a curve portion mode detected by the RS flip-flop 99, curve determination information obtained by the curve portion determining section 103 described later and an actual travel distance of the front wheel 44 from the start point 66 of a curve portion to be measured by the front wheel curve portion travel distance detecting section 96.

The rear wheel travel control section 102 outputs a control mode (torque control or speed control) and a speed command value (in speed control) to the rear wheel inverter 76B, based on a curve travel mode inputted from the general control section 81, a speed command value and data of a travel state inputted from the travel command section 94, an actual speed measured by the speed detector 92, a curve portion mode detected by the RS flip-flop 99, an entrance or exit position mode detected by the XOR 100, curve determination information obtained by the curve portion determining section 103 described later and an actual transfer distance of the rear wheel 44 from the start point 66 of a curve portion to be measured by the rear wheel curve portion travel distance detecting section 98.

The curve portion determining section 103, after determining that the shape of the travel path 4 is a counterclockwise curve portion or a counterclockwise curve portion based on a travel distance measured by the travel distance detecting section 91, outputs the curve determination information to the front wheel travel control section 101 or the rear wheel travel control section 102. Note that it is set in advance by a travel distance from the origin 64 whether the shape of the travel path 4 is a linear portion, a clockwise curve or a counterclockwise curve.

Figure 10:
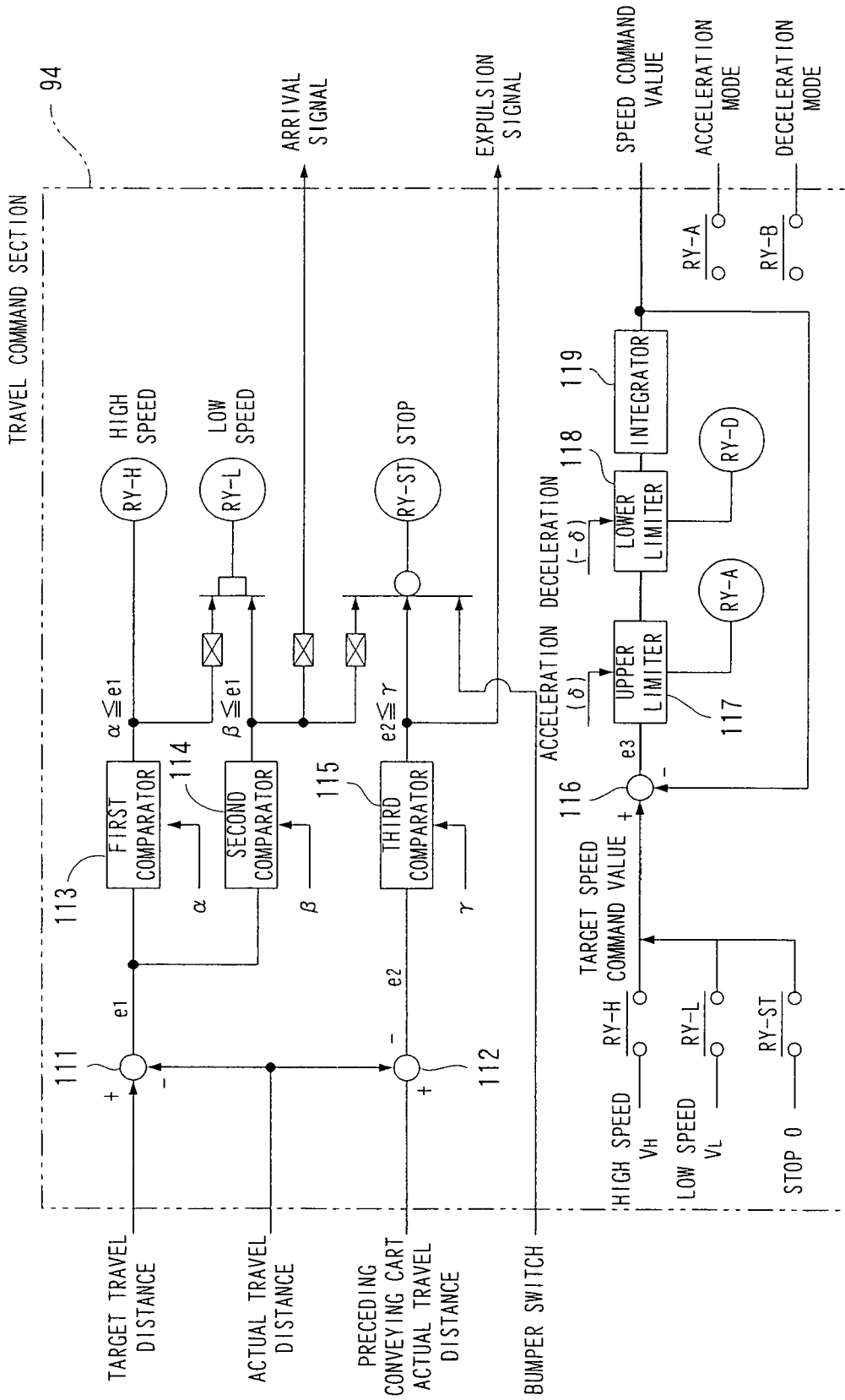
FIG. 10 is a block diagram of a travel command section of the travel control section of the article conveying system.

In FIG. 10, there is shown a control block of the travel command section 94.

The travel command section 94 is constituted of subtracters 111, 112 and 116, a first comparator 113, a second comparator 114, a third comparator 115, an upper limiter 117, a lower limiter 118, an integrator 119, a relay RY-L, a relay RY-ST, a relay RY-A, a relay RY-D and the like.

The subtracter 111 subtracts an actual travel distance measured by the travel distance detecting section 91 from a target travel distance obtained by the target travel distance setting section 93 to obtain a remaining travel distance e1 of a conveying cart 3.

The subtracter 112 subtracts an actual travel distance measured by the travel distance detecting section 91 from an actual travel distance of a traveling conveying cart 3 preceding an objective conveying cart 3 which is inputted from the optical sensor receiver 70, and obtains a distance e2 from the preceding conveying cart.

The first comparator 113 operates, when the remaining distance e1 of the objective conveying cart 3 obtained by the subtracter 111 is a preset distance α or more, to drive the relay RY-H.

The second comparator 114 operates, when the remaining distance e1 of the objective conveying cart 3 obtained by the subtracter 111 is a preset distance β (<α) or more.

The third comparator 115 operates, when the distance e2 between the objective conveying cart 3 and the preceding conveying cart 3 obtained by the subtracter 112 is a preset distance γ or less.

The relay RY-L operates, when a remaining travel distance e1 of a conveying cart 3 is less than a preset α (an output of the first comparator 113 is turned off) and a preset distance β or more (an output of the second comparator 114 is turned off).

The relay RY-ST operates, when a remaining travel distance e1 of a conveying cart 3 is less than a preset distance β (an output of the second comparator 114 is turned off), a distance e2 from a conveying cart 3 preceding the objective conveying cart 3 is a preset distance γ or less (an output of the third comparator 115 is turned off) or a detection signal of the bumper switch 62 is tuned on.

The subtracter 116, when the relay RY-H operates, selects a preset high speed VH; when the relay RY-L is operates, selects a preset low speed VL; and when the relay RY-ST operates, selects a preset speed 0 (zero), and subtracts a current speed command value (an output of the integrator 119) described later from a target speed command value obtained by the selection thereby to obtain a speed deviation e3.

Set in the upper limiter 117 is the upper limit of the speed deviation e3 obtained by the subtracter 116.

Set in the upper limiter 118 is the lower limit of the speed deviation e3 obtained by the subtracter 116.

The integrator 119 integrates a speed deviation e3 limited by the upper limiter 117 and the lower limiter 118 thereby to form and output a speed command value limited by a acceleration δ (>0) and a deceleration (−δ) set in the upper limiter 117 and the lower limiter 118, respectively.

The relay RY-A operates, when the speed deviation e3 is limited by the upper limit (acceleration δ) in the upper limiter 117, that is in acceleration. Note that when the relay RY-A operates, the travel command section 94 outputs an acceleration mode signal as a signal of a travel state.

The relay RY-D operates, when the speed deviation e3 is limited by the lower limit (deceleration −δ) in the lower limiter 118, that is in deceleration. Note that when the relay RY-D operates, the travel command section 94 outputs a deceleration mode signal as a signal of a travel state.

An arrival signal is outputted, when a remaining travel distance e1 of a conveying cart 3 is less than a preset distance β (an output of the second comparator 114 is turned off), that is the conveying cart 3 arrives at a target station 5. An expulsion signal is outputted, when a distance e2 from a preceding conveying cart 3 is a preset distance γ or less (an output of the third comparator 115 is turned on), that is an objective conveying cart 3 cannot travel since the preceding conveying cart 3 is present in the vicinity thereof.

In FIG. 11, there are shown modes of travel control of the front wheel 44 and rear wheel 44, that is modes when a travel state is a stationary state (a travel state at a prescribed speed), an acceleration state or a deceleration state, or when a travel path is in a linear portion or a curve portion.

Mode 0

The mode 0 is a mode when a travel state of a conveying cart 3 is a stationary state and a travel path is in a linear portion, and on this occasion, torque control is executed on the front wheel 44 while speed control is executed on the rear wheel 44.

Modes 1 to 3

The modes 1 to 3 are modes when a travel state of a conveying cart 3 is a stationary state and a travel path is in a curve portion, and one of the modes is selected by the ground controller 71 (the curve travel mode) and executed. In the mode 1, speed control is executed on the front wheel 44, while torque control is executed on the rear wheel 44. In the mode 2, speed control is executed on the front wheel 44 and the rear wheel 44 is placed in a state of free-run when the rear wheel 44 is in the entrance or exit position mode, while torque control is executed when it is not in the entrance or exit position mode, that is in a state other than a free-run section. In the mode 3, positional speed control is executed on the front wheel 44 and rear wheel 44.

Mode 4

The mode 4 is a mode when a travel state of a conveying cart 3 is in an acceleration state, that is in the acceleration mode (when the conveying cart 3 is accelerated from a stop state) and torque control is executed on the front wheel 44, while speed control is executed on the rear wheel 44.

Mode 5

The mode 5 is a mode when a travel state of a conveying cart 3 is in a deceleration state, that is in the deceleration mode, and speed control is executed on the front wheel 44, while torque control is executed on the rear wheel 44.

Figure 12:
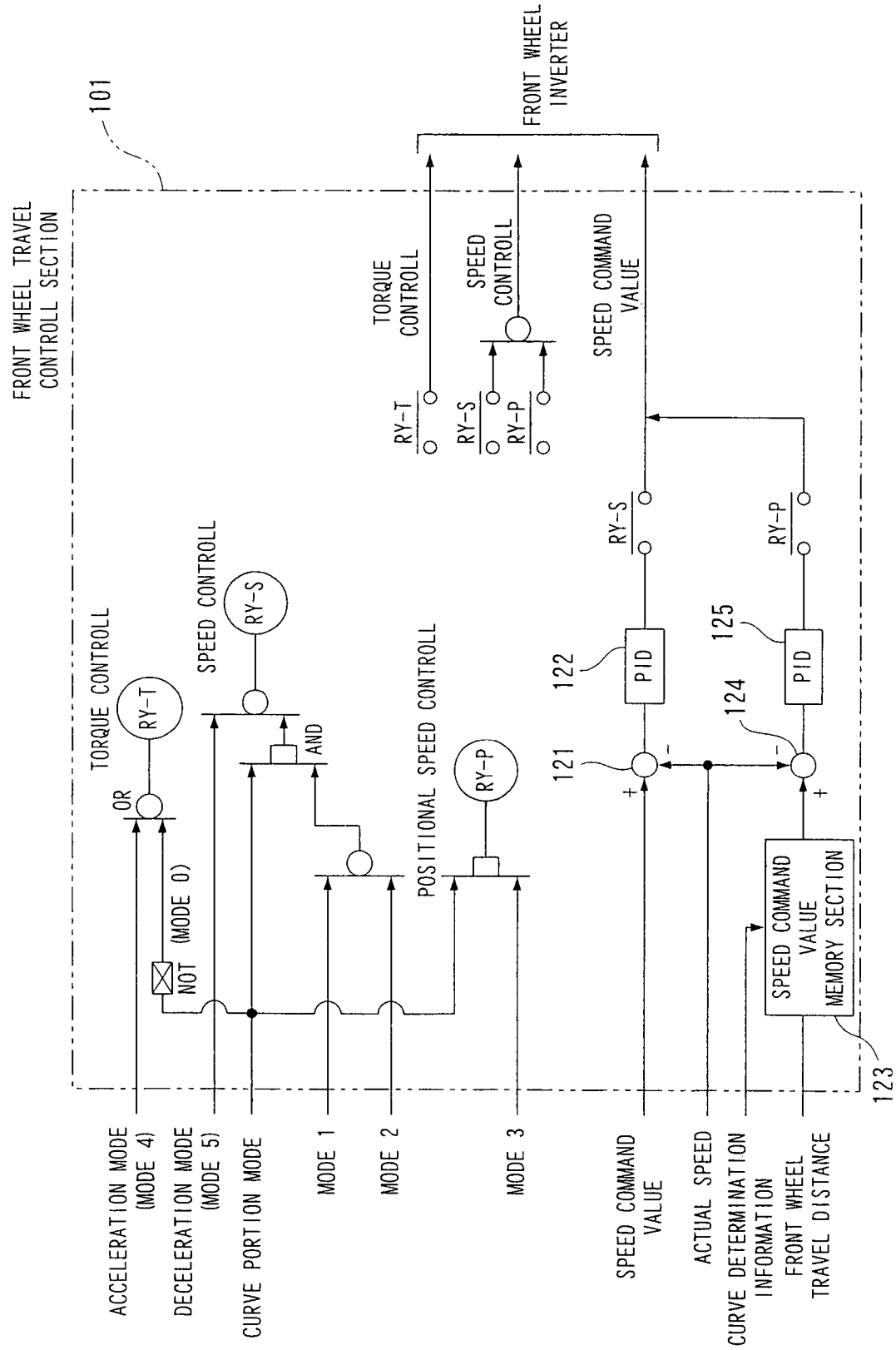
FIG. 12 is a block diagram of a front wheel travel control section of the travel control section of the article conveying system.

In FIG. 12, there is shown a control block of the front wheel travel control section 101.

The front wheel travel control section 101 is constituted of subtracters 121 and 124, PID control sections 122 and 125, a speed command value memory section 123, a relay RY-T, a relay RY-S, a relay RY-P and the like.

The subtracter 121 subtracts an actual speed measured by the speed detector 92 from a speed command value inputted from the travel command section 94 to obtain a speed deviation.

The PID control section 122 forms a speed command value to be outputted to the front wheel inverter 76A based on the speed deviation obtained by the subtracter 121.

The speed command value memory section 123 confirms whether a curve portion is clockwise or counterclockwise and obtains a target travel speed command value from an actual travel distance of the front wheel 44 from the curve portion start point 66 measured by the front wheel curve portion travel distance detecting section 96 based on the shape of the confirmed curve portion (clockwise or counterclockwise). Note that that a target travel speed command value is preset at a travel distance from the origin 66 of a curve portion according to whether the shape of a travel path 4 of interest is a clockwise curve or a counterclockwise curve.

The subtracter 124 subtracts an actual speed measured by the speed detector 92 from a target travel speed command value set by the speed command value memory section 123 thereby to obtain a speed deviation.

The PID control section 125 forms a speed command value to be outputted to the front wheel inverter 76A from the speed deviation obtained by the subtracter 124.

There is provided the relay RY-T operating when torque control is executed, the relay RY-S operating when speed control is executed and a relay RY-P operating when positional speed control is executed by combining the curve travel mode inputted from the general control section 81, the acceleration mode and deceleration mode inputted from the travel command section 94 and the curve portion mode detected by the RS flip-flop 99 according to travel control modes of FIG. 11. Torque control is outputted to the front wheel inverter 76A as a control mode when the relay RY-T operates, while speed control is outputted to the front wheel inverter wheel 76A as a control mode when the relay RY-S or the relay RY-P operates.

Selected when speed control is executed (the relay RY-S is turned on) is a speed command value formed by the PID control section 122 while an actual speed is fed back based on a speed command value commanded by the travel command section 94 and the speed command value is outputted to the front wheel inverter 76A. Selected when positional speed control is executed (the relay RY-P is turned on) is a speed command value formed by the PID control section 125 while an actual speed is fed back based on a target travel speed command value set for a distance (a travel position of the front wheel 44) from the preset start point 66 and the speed command value is outputted to the front wheel converter 76A.

The front inverter 76A, when a control mode is of torque control, drives the travel motor 45A for the front wheel 44 with a voltage or a phase adapted for a preset torque. The travel motor 45A, when a control mode is of speed control, is driven so that the number of rotations of the travel motor 45A for the front wheel 44 takes a speed command value, that is a number-of-rotations command value corresponding to the speed command value.

Figure 13:
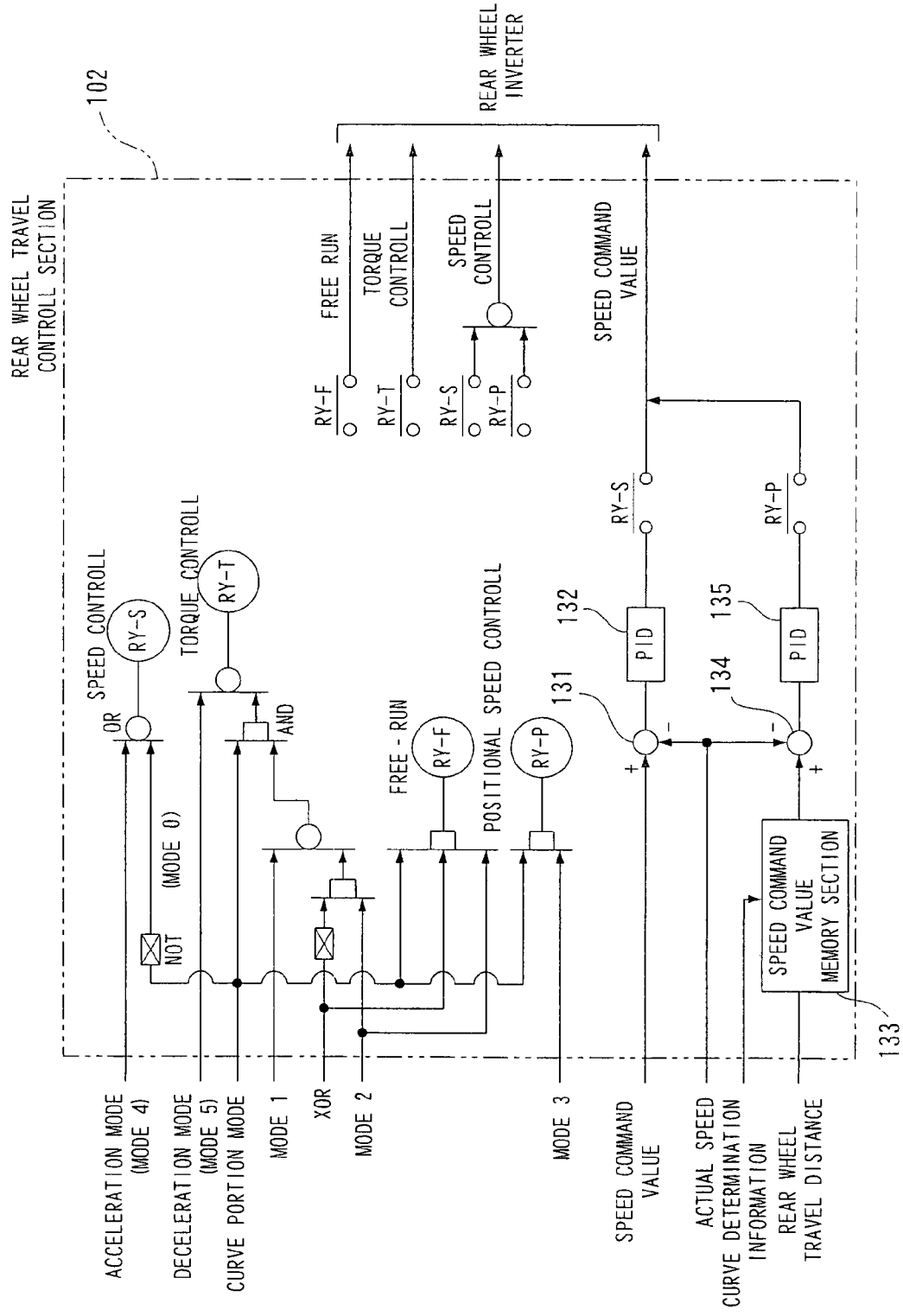
FIG. 13 is a block diagram of a rear wheel travel control section of the travel control section of the article conveying system.

In FIG. 13, there is shown a control block of the rear wheel travel control section 102.

The rear wheel travel control section 102 is constituted of subtracters 131 and 134, PID control sections 132 and 135, a speed command value memory section 133, a relay RY-T, a relay RY-S, a relay RY-P, a relay RY-F and the like.

The subtracter 131 subtracts an actual speed measured by the speed detector 92 from a speed command value inputted from the travel command section 94 thereby to obtain a speed deviation.

The PID control section 132 forms a speed command value to be outputted to the rear wheel inverter 76B from the speed deviation obtained by the subtracter 131.

The speed command value memory section 133 confirms whether a curve portion is clockwise or counterclockwise based on the curve determination information and obtains a target travel speed command value from an actual travel distance of the rear wheel 44 from the start point 66 of a curve portion measured by the rear wheel curve portion travel distance detecting section 98 based on the shape of the confirmed curve portion (clockwise or counterclockwise). Note that that a target travel speed command value is preset at a distance (a travel position) from the origin 66 of a curve portion according to whether the shape of a travel path 4 of interest is a clockwise curve or a counterclockwise curve.

The subtracter 134 subtracts an actual speed measured by the speed detector 92 from a target travel speed command value set by the speed command value memory section 133 to obtain a speed deviation.

The PID control section 135 forms a speed command value to be outputted to the rear wheel inverter 76B from the speed deviation obtained by the subtracter 134.

There are provided the relay RY-T operating when torque control is executed, the relay RY-S operating when speed control is executed, a relay RY-P operating when positional speed control is executed and a relay RY-F operating when free-run is executed by combining the curve travel mode inputted from the general control section 81, the acceleration mode and deceleration mode inputted from the travel command section 94, the curve portion mode detected by the RS flip-flop 99 and the entrance or exist position mode detected by the XOR 100 according to travel control modes of FIG. 11. Free-run is outputted to the rear wheel inverter 76B as a control mode when the relay RY-F operates, torque control is outputted to the rear wheel converter 76B as a control mode when the relay RY-T operates and speed control is outputted to the rear wheel inverter 76B as a control mode when the relay RY-S or the relay RY-P operates.

The relay RY-F that operates when the free run is executed operates when the curve travel mode is the mode 2, the curve portion mode, and the entrance or exit position mode. That is, the relay RY-F operates, when the mode 2 is selected, a conveying cart 3 is traveling in a curve portion, and one of the front wheel 44 and the rear wheel 44 is located at one of the entrance and exit of a curve portion.

When speed control is executed (when the relay RY-S is turned on), a speed command value formed by the PID control section 132 while an actual speed is fed back is selected based on a speed command value commanded by the travel command section 94 to output the speed command value to the rear inverter 76B. When positional speed control is executed (when the relay RY-P is turned on), a speed command value formed by the PID control section 135 while an actual speed is fed back is selected based on a target travel speed command value set for a distance (a travel position of the rear wheel 44) from a preset start position 66 to output the speed command value to the rear wheel inverter 76B.

When a control mode is of torque control, the rear wheel inverter 76B drives the travel motor 45B for the rear wheel 44 with a voltage or a phase adapted for a preset torque. When a control mode is of speed control, the rear wheel inverter 76B drives the travel motor 45B so that the number of rotations of the travel motor 45B for the rear wheel 44 takes a speed command value, that is the number of rotations thereof takes a number-of-rotations command value corresponding to the speed command value. When a control mode is of free run, the travel motor 45B for the rear wheel 44 is disconnected from a driving power supply thereby to cause the travel motor 45B for the rear wheel 44 to be in a free-run state.

Note that a target travel speed command value for a distance from the start point 66 (a travel position) preset in cases of a clockwise curve or a counterclockwise curve in the speed command value memory section 123 for the front wheel 44 and the speed command value memory section 133 for the rear wheel 44 is exactly set and registered according to a travel curve in which a travel speed of each wheel 44 is accelerated or decelerated so that neither of the wheels 44 slips and realizes a high and smooth speed travel in consideration of learning of the entrance and exist position, a radius of a curve portion and arrangement of the travel motors 45A and 45B.

Description will be given of travel control of the vehicle body 11 by the travel control section 83 of the body controller 73 of the above construction.

"Recognition of Travel Position"

The body controller 73 is reset by detection of the origin 64 by means of the origin detector 65, and counts pulses outputted from the encoder 63A of the front wheel thereby to measure a current travel distance (a distance from the origin 64 on the travel rails 1), and thereafter transmits the travel distance to the optical sensor receiver 70 of a conveying cart 3 which follows an objective conveying cart 3 from the optical sensor transmitter 69 of the objective conveying cart 3. The travel distance is differentiated to obtain an actual speed.

"Travel Control"

The travel control section 83 executes travel control using the address of a station 5 as a conveyance source of conveyance data inputted from the general control section 81 or the address of a station 5 as a conveyance destination as a target travel position.

That is, a target travel distance from the origin 64 obtained from the address of a station 5 as a target travel position is obtained, subsequently a difference between the target travel distance and a current travel distance is obtained. Travel speed is set to a high speed (for example, 100 m/min) when the difference is a set distance α or more, and the travel speed is set to a low speed (for example, 40 m/min) when the difference is less than the set distance α and a set distance β or more. And the travel is started at thus set travel speed. When the difference is less than the set distance β, that is when an objective conveying cart arrives at the target travel position, a travel speed 0 is selected and travel is ceased. Calculation is performed on an inter-vehicle distance from a current travel distance of a preceding conveying cart 3 which is received by the optical receiver 70 of an objective conveying cart 3 and a current travel distance of the objective conveying cart 3, and when the inter-vehicle distance is smaller than the prescribed minimum distance γ, it is determined that the distance between the conveying carts 3 are excessively smaller to temporality cease travel of the objective conveying cart 3 and transmit "an expulsion signal" containing a specific number of the objective conveying cart to the ground controller 71. When the preceding conveying cart 3 advances thereby to increase the inter-vehicle distance to more than the prescribed minimum distance, the objective conveying cart 3 resumes travel. When the bumper switch 62 operates, it is determined that a rear end collision between conveying carts occurs, travel is temporarily ceased, and when the bumper switch 62 is out of operation (turned off), travel is resumed.

Travel control is executed in a travel mode shown in FIG. 11 during travel.

That is, when travel is in a linear portion (mode 0) or when acceleration is effected (mode 4), the rear wheel 44 on which the center of gravity of a conveying cart 3 is located (a wheel on the heavier wheel weight side) is subjected to speed control to take a set travel speed, while the front wheel 44 that tends to float up (a wheel on the lighter wheel weight side) is subjected to torque control.

When a conveying cart 3 travels in the mode 1 or 2, the front wheel 44 on which the center of gravity is located in a curve portion is subjected to speed control, and on the other hand, the rear wheel 44 that tends to float up is subjected to torque control in the mode 1. In the mode 2, free run is executed at the entrance or exit of a curve and torque control is executed in portions other than a free-run section.

When a conveying cart 3 travels in a curve portion in the mode 3, the front wheel 44 and rear wheel 44 are subjected to speed control at preset travel speeds at travel positions in a clockwise curve portion and a counterclockwise curve portion.

When a conveying cart 3 reduces a speed (mode 5), the front wheel 44 on which the center of gravity of the conveying cart 3 is located (a wheel on the heavier wheel weight side) is subjected to speed control to run at a set travel speed, and on the other hand, the rear wheel 4 that tends to float up (a wheel on the lighter wheel weight side) is subjected to torque control.

According to the embodiment, as described above, when a conveying cart 3 travels in a curve portion in the mode 1, or when a conveying cart 3 travels in a curve portion in travel sections other than the entrance or exit of a curve portion (travel sections other than a free-run section) in the mode 2, the change over is effected between wheels under torque control from the front wheel 44 to the rear wheel 44, the front wheel 44 on which the center of gravity of a conveying cart 3 is located (on the heavier wheel weight side) is subjected to speed control, and the rear wheel 44 that tends to float up is subjected to torque control, so that a travel speed of a conveying cart 3 can be maintained by speed control of the front wheel 44, and a slip of the rear wheel 44 can be simultaneously prevented by torque control, thereby enabling a conveying cart 3 to travel at a high speed in a curve portion. As a result, a conveying cart 3 can reduce a travel time to be consumed in travel of a target travel distance, which can improve a conveyance efficiency, thereby enabling an operation efficiency of the facility to be improved. Since a slip of the rear wheel 44 is prevented, torque can be imposed on both wheels 44 at all times, thereby enabling driving capacities of the travel motors 45A and 45B to be smaller.

According to the embodiment, when one of the front wheel 44 and the rear wheel 44 travels in a curve portion in the mode 2, that is at the entrance or exit of a curve, not only the rear wheel 44 is prevented from slipping by being placed under free-run, but also interference is prevented between both wheels 44 at the entrance or exit of a curve portion, and a conveying cart 3 travels smoothly from a linear portion to a curve portion, or from a curve portion to a linear portion, thereby enabling a conveying cart 3 to travel in a curve portion at a high speed. Since no necessity arises to control the rear wheel 44 at the entrance or exit of a curve portion, the apparatus can be reduced in cost. Furthermore, since no necessity arises to exactly grasp and control the positions of both wheels at the entrance or exit of a curve portion, on-the-spot adjustment in a working place can be done relatively simply.

According to the embodiment, the wheels 44 in the mode 3 are controlled at a speed adapted for a detected travel position in a curve and speeds thereof are adjusted not to cause a slip, so that necessary torque can be applied to the both wheels at all times. By this, rapid acceleration and deceleration can be smoothly implemented, thereby enabling a conveying cart 3 to travel smoothly at a high speed in a curve portion, and enabling driving capacities of the travel motors 45A and 45B to be smaller. In the case where load fluctuation is large due to changes in travel speed while a conveying cart 3 travels in a curve portion (when liquid or elastomer is conveyed as an article R), over-running due to torque deficiency is hardly caused to occur.

In the embodiment, speed control is conducted on one wheel 44 on which the center of gravity is located according to an acceleration or deceleration state of a conveying cart 3, and torque control is conducted on the other wheel 44, thereby securing a speed of the one wheel 44 according to a speed command of the conveying cart 3, preventing a slip of the other wheel 44, and enabling a slip or over-run due to load fluctuations caused during acceleration or deceleration to be avoided. Furthermore, an initial driving torque necessary for acceleration can be obtained. Since a slip of the other wheel 44 is prevented, necessary torque can be applied to the both wheels at all times, which enables driving capacities of the travel motors 45A and 45B to be smaller.

In the embodiment, the change-over is effected between torque control and speed control of the front wheel 44 and rear wheel 44 in order to avoid a slip or over-run due to load fluctuations during acceleration or deceleration, however when a conveying cart 3 is in the mode 2 (free-run is executed at the entrance or exit of a curve portion), it may be possible to effect a change-over of the wheel in a free-run state to the front wheel 44, or to return the both wheels into a driving control state, or to reduce in acceleration/deceleration.

In the embodiment, a curve travel mode is set by the ground controller 71, however it may be possible to preset a curve travel mode (one of the modes 1 to 3) for each conveying cart 3.

Figure 14A:
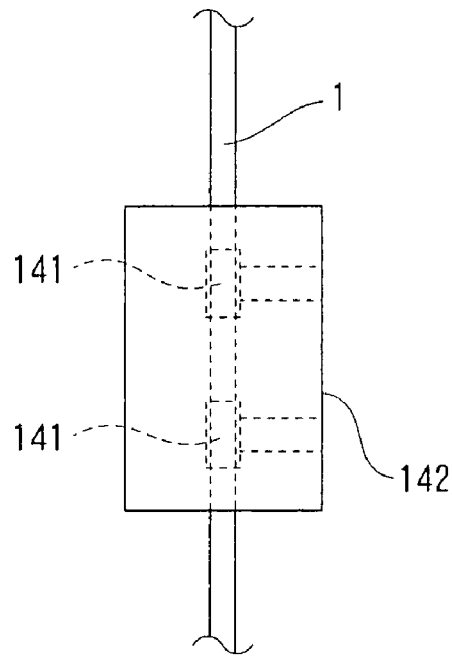
FIGS. 14A to 14D are descriptive views of conveying carts of the article conveying system in another embodiments of the present invention.
Figure 14B:
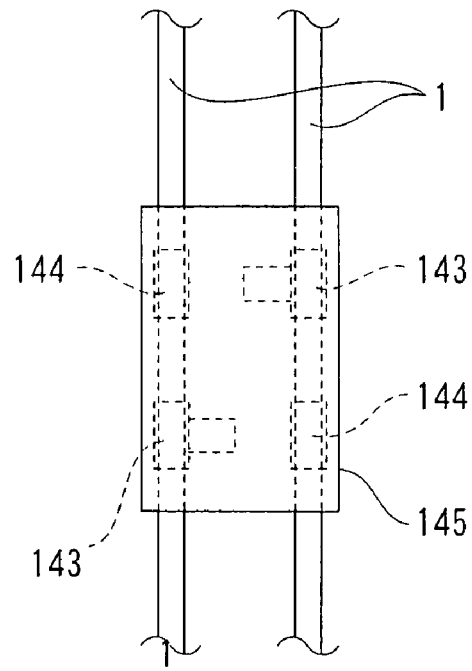
Figure 14C:
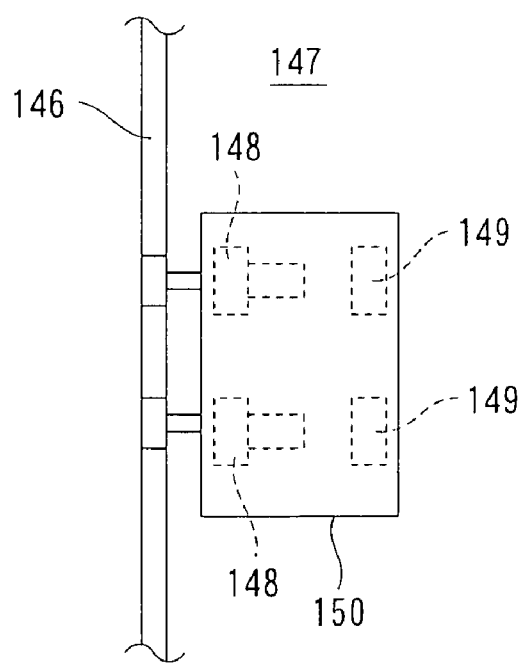
Figure 14D:
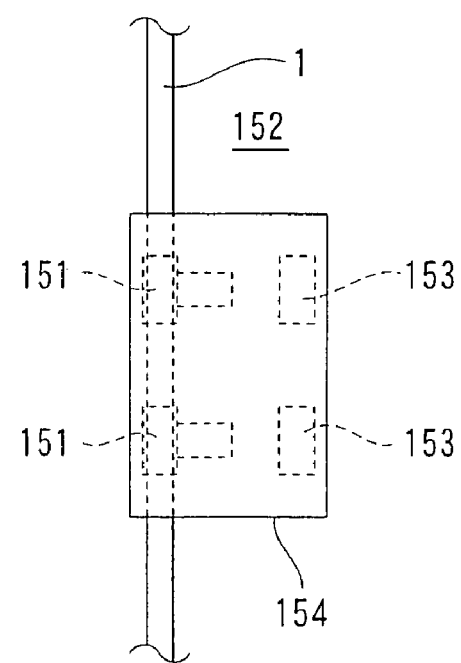

In the embodiment, a travel vehicle is a three-wheel conveying cart 3, however there may be adopted a travel vehicle with two front wheels and two rear wheels, all being independently drivable driving wheels. For example, a stacker crane for use in an automatic ware house may have front and rear driving wheels. Further, as shown in FIG. 14A, a conveying cart 142 may have two wheels (both being driving wheels 141) which travel while being guided by a single travel rail 1. Further, as shown in FIG. 14B, a conveying cart 145 may have four wheels (one front driving wheel 143 and one rear driving wheel 143, and the other two being driven wheels 144) which travel while being guided by two travel rails 1. Furthermore, as shown in FIG. 14C, a conveying cart 150 may have four wheels (one front driving wheel 148 and one rear driving wheel 148, and the other two being driven wheels 149) which travel on a floor surface 147 while being guided by a single guide rail 146 as a travel path. Still further, as shown in FIG. 14D, a conveying cart 154 may have four wheels (one front driving wheel 151 and one rear driving wheel 151, both guided by a single travel rail 1, and the other two being driven wheels 153 traveling on a floor 152) which travel while being guided by a single travel rail 1.

In the embodiment, the inverters 76A and 76B are exemplified as travel driving units for driving a conveying cart 3, however various modifications may be made to configuration of the travel driving unit such that, for example, the travel driving unit itself may include a unit for detecting the travel speed of the conveying cart 3, and a circuit for feed-back control, so that a speed command value commanded from the travel control section 83 coincides with a detected travel speed.

In the embodiment, output pulses from the encoders 63A and 63B are counted to detect a travel distance and an actual speed of a conveying cart 3 which is an example of a travel vehicle, however various other modifications may be made to the configuration. For example, a so-called linear encoder maybe installed along the travel rails 1 to detect a travel distance of a travel vehicle.

What is claimed is:

1. A travel control method for a travel vehicle comprising front and rear driving wheels that support the travel vehicle, and driving wheel units mounted to said front and rear driving wheels for driving said driving wheels, said travel vehicle being operated to travel in an unmanned manner while being guided by a travel rail having a linear portion and a curved portion, wherein when the travel vehicle travels in the linear portion of the rail, the driving wheel unit for the rear driving wheel in the travel direction of the travel vehicle is subjected to speed control and the driving wheel unit for the front driving wheel in the travel direction of the travel vehicle is subjected to torque control to prevent slipping of the front driving wheel in the travel direction of the travel vehicle, in an acceleration state and a stationary state, and the driving wheel unit for the front driving wheel in the travel direction of the travel vehicle is subjected to speed control and the driving wheel unit for the rear driving wheel in the travel direction of the travel vehicle is subjected to torque control to prevent slipping of the rear driving wheel in the travel direction of the travel vehicle, in a deceleration state, and when the travel vehicle travels in the curved portion of the rail, the driving wheel unit for the front driving wheel in the travel direction of the travel vehicle is subjected to speed control and the travel driving unit for the rear driving wheel in the travel direction of the travel vehicle is subjected to torque control to a preset torque for preventing the rear driving wheel in the travel direction of the travel vehicle from slipping.

2. A travel control method for a travel vehicle comprising front and rear driving wheels that support the travel vehicle, and driving wheel units mounted to said front and rear driving wheels for driving said driving wheels, said travel vehicle being operated to travel in an unmanned manner while being guided by a travel rail having a linear portion and a curved portion, wherein when the travel vehicle travels in the linear portion of the rail, the driving wheel unit for the rear driving wheel in the travel direction of the travel vehicle is subjected to speed control and the driving wheel unit for the front driving wheel in the travel direction of the travel vehicle is subjected to torque control to prevent slipping of the front driving wheel in the travel direction of the travel vehicle, in an acceleration state and a stationary state, and the driving wheel unit for the front driving wheel in the travel direction of the travel vehicle is subjected to speed control and the travel driving unit for the rear driving wheel in the travel direction of the travel vehicle is subjected to torque control to prevent slipping of the rear driving wheel in the travel direction of the travel vehicle, in a deceleration state, and when the travel vehicle travels in the curved portion of the rail, the driving wheel unit for the front driving wheel in the travel direction of the travel vehicle is subjected to speed control, when the rear driving wheel in the travel direction of the travel vehicle travels through an entrance or exit of the curved portion, the rear driving wheel in the travel direction of the travel vehicle is subjected to free-run, and when the travel vehicle travels in the curved portion in other than a travel section in which the rear driving wheel in the travel direction of the travel vehicle is subjected to free-run, the driving wheel unit for the rear driving wheel in the travel direction of the travel vehicle is subjected to torque control to a preset torque for preventing the rear driving wheel in the travel direction of the travel vehicle from slipping.

3. A travel control method for a travel vehicle comprising front and rear driving wheels that support the travel vehicle, and driving wheel units mounted to said front and rear driving wheels for driving said driving wheels, said travel vehicle being operated to travel in an unmanned manner while being guided by a travel rail having a linear portion and a curved portion, wherein when the travel vehicle travels in the linear portion of the rail, the driving wheel unit for the rear driving wheel in the travel direction of the travel vehicle is subjected to speed control and the travel driving unit for the front driving wheel in the travel direction of the travel vehicle is subjected to torque control to prevent slipping of the front driving wheel in the travel direction of the travel vehicle, in an acceleration state and a stationary state, and the driving wheel unit for the front driving wheel in the travel direction of the travel vehicle is subjected to speed control and the travel driving unit for the rear driving wheel in the travel direction of the travel vehicle is subjected to torque control thereby to prevent slipping of the rear driving wheel in the travel direction of the travel vehicle, in a deceleration state, and when the travel vehicle travels in the curved portion of the rail, travel positions of the respective front and rear driving wheels in the curved portion are detected, and the travel driving units for the respective driving wheels are subjected to speed control in correspondence to the respective detected travel positions.

* * * * *